United States Patent Office 3,222,661
Patented Dec. 7, 1965

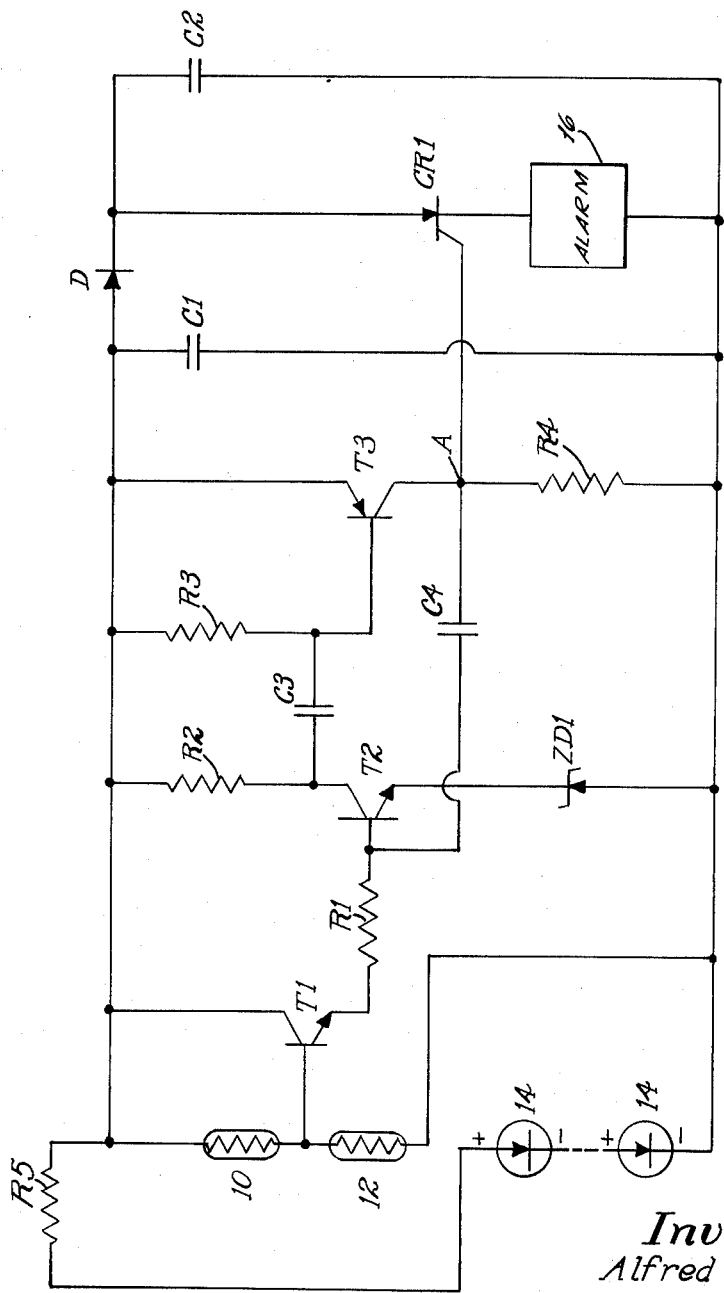

3,222,661
FIRE DETECTOR ENERGIZED BY A
PHOTO-GENERATIVE CELL
Alfred W. Vasel, 222 Linwood St., Abington, Mass., and Rudolph W. Kalns, 21 Madison St. S., Weymouth, Mass.
Filed July 30, 1962, Ser. No. 213,256
2 Claims. (Cl. 340—228)

This invention relates generally to radiant energy detecting apparatus and has particular reference to fire detecting apparatus which is adapted for use in locations that are remote or difficult of access.

Fire detecting systems in common use utilize various types of photo-resistive detector elements which depend on a decrease in resistance on viewing a fire to actuate an alarm through suitably energized circuitry and relays.

It is frequently desired to have detection units in locations which are difficult of access or remote and consequently unduly expensive to provide the necessary wiring for energizing the detector unit and the alarm.

The object of this invention is to provide a fire detector unit which is capable of operation without external wiring to provide a source of power.

A further object of the invention is to provide a detector unit which is capable of being energized by ambient light.

A further object of the invention is to provide a detector unit which is capable of being energized by radiation produced by a fire in an area under surveillance.

A further object of the invention is to provide a detector unit which has means responsive to sunlight, incandescent light, or fire radiation to provide energizing power, and means responsive only to fire radiation for actuating alarm means.

A further object of the invention is to provide a detector unit of the type described in which photo-resistive circuitry responsive only to fire radiation is energized by photo-generated means responsive to either fire radiation or other radiation.

Other objects of the invention will be apparent to one skilled in the art from the following detailed description of a specific embodiment thereof.

The drawing is a schematic circuit diagram of a self-energized fire detecting unit embodying the features of the invention.

Referring to the drawing, there is illustrated a self-energized fire detector unit which comprises photo-resistive detector cells 10 and 12 which may be arranged to view a space under surveillance, and photo-generative cells 14 which may be arranged to view either the space under surveillance or ambient light. The detector cells 10 and 12 are adapted to actuate, through suitable circuitry to be described, an alarm unit 16.

In the illustrated embodiment, the voltage developed by the photo-generative cells 14 on viewing a source of radiation such as ambient light or fire, charges both a circuit-energizing capacitor C1 and an alarm-energizing capacitor C2, connected in parallel across the series-connected cells 14. The capacitor C1 is charged directly, and the capacitor C2 is charged through a diode D for a purpose to appear hereinafter.

The detector cells 10 and 12 are connected in series across the circuit-energizing capacitor C1. In the illustrated embodiment, the detector cell 10 is formed of material primarily responsive by a decrease in resistance, to light in the red to infrared band (for example, polycrystalline cadmium sulfide), and cell 12 is primarily responsive by a decrease in resistance, to light in the blue band.

The voltage of condenser C1 applied across the cells 10 and 12 causes a voltage to appear at the junction of the cells which depends on the relative resistance of the cells, as will appear hereinafter. The junction of the cells is connected to the base of transistor T1 whose collector is connected to the positive side of the condenser C1, and whose emitter is connected through resistor R1 to the base of transistor T2. The collector of transistor T2 is connected through resistor R2 to the positive side of the condenser and the emitter is connected through zener diode ZD1 to the negative side of the condenser.

The zener diode is poled so that it tends to oppose emitter-collector current through transistor T2 until a voltage higher than the zener threshold is reached at the positive side of the zener diode.

The collector of transistor T2 is also connected through condenser C3 to the base of transistor T3 which is also connected to the positive side of condenser C1 through resistor R3. The emitter of transistor T3 is connected to the positive side of condenser C1, and the collector is connected to the control electrode of controlled rectifier CR1, to the negative side of condenser C1 through resistor R4, and to the base of transistor T2 through feedback capacitor C4.

The controlled rectifier CR1 is connected in series with the alarm unit 16 across condenser C2 so that on application of a positive pulse to the control electrode CR1, current flows through the alarm unit from the condenser.

In applications where the photo-generative cells 14 normally view sunlight or incandescent light, the condensers C1 and C2 are maintained in the charged condition. In a particular embodiment, where a potential of 6 volts is desired to operate the control circuitry and activate the alarm unit, 12 to 15 photo-generative cells, each generating 0.4 to 0.5 volt, may be connected in series across the condensers.

When viewing a chamber that is in total darkness, the resistance of such cells is substantially infinite, so that no voltage appears at the base of transistor T1.

As described in the above-identified application, this particular cell arrangement is capable of distinguishing between flame and other sources containing infra-red, such as sunlight and incandescent light. With the zener diode selected to permit collector-emitter current in transistor T2 when the voltage at the junction of the detector cells 10 and 12 slightly exceeds 3 volts, the action of the cells under various conditions is as follows:

| Light source | Cell 10 res. | Cell 12 res. | Voltage at T1 base |
|---|---|---|---|
| Incandescent | 110,000 | 80,000 | 2.53 |
| Sunlight | 50,000 | 10,000 | 1 |
| Fire (Small) | 800,000 | 10,000,000 | 5.56 |
| Fire (Large) | 100,000 | 1,000,000 | 5.45 |

Under exposure to incandescent light or sunlight, the relative resistance of cells 10 and 12 is such that insufficient voltage appears at the base of transistor T1 to energize the circuit. However, when exposed to fire radiation which contains principally infra-red, the voltage at the base of transistor T1 rises to about 5½ volts, thereby permitting substantial current to flow in the collector-emitter path of T1 to cause the base of transistor T2 to go sufficiently positive to permit sufficient conduction in the collector-emitter path to raise the voltage of the zener diode above the zener threshold voltage of 3 volts.

The resulting current flow causes the voltage at the condenser C3 to fall, causing a corresponding fall in voltage at the opposite side of the condenser C3 so that the base of transistor T3 goes negative, permitting conduction in the emitter-collector path.

The voltage at point A and at the control electrode of the controlled rectifier thereby goes positive. The positive voltage increase at point A effects feed-back through condenser C4 to further raise the voltage at the base of transistor T2 to further raise the voltage at the control electrode of the controlled rectifier in the manner described. The positive voltage thereby applied to the control electrode permits conduction through the controlled rectifier from the condenser C2 through the alarm unit 16.

The alarm unit may be any suitable device for producing an audible or visual signal. In the illustrated embodiment, in which the energy for the alarm unit is provided by a condenser, the alarm unit must be capable of responding to the single energy pulse produced thereby and for such purpose, the alarm unit may be an electrically-fired explosive squib or the like. In some cases, the alarm unit may be adapted to energize electric or explosively actuated valves or other apparatus to inject fire extinguishing fluid into the space under surveillance.

It will be noted that since the alarm actuating condenser C2 is separated from the circuit energizing condenser C1 by diode D1, the discharge of condenser C1 for operation of the transistor circuitry does not discharge condenser C2, leaving it fully charged to actuate the alarm unit.

In the above-described method of operation, it has been assumed that the photo-generative cells are exposed to ambient light. In some installations the photo-generative cells may receive no ambient light for long periods of time. In such case, although the condensers C1 and C2 will be in a discharged condition, in case of fire the radiation therefrom will charge the condensers rapidly enough to permit a prompt response of the circuit to actuate the alarm unit in the manner previously described.

In some installations it may be desirable to have separate groups of photo-generative cells, one group viewing the area under surveillance and the other group viewing ambient light. During hours of darkness, the photo-generative cells may be positioned to view artificial illumination to maintain the condensers in a charged condition.

It will also be understood that in place of the condensers C1 and C2, other types of electrical energy storage means may be used, such as batteries capable of being maintained in the charged condition by the photo-generative cells, in which case either types of alarm units may be utilized.

Since certain other obvious changes may be made in the device without departing from the scope of the invention, it is intended that all matter contained herein be interpreted in an illustrative and not a limiting sense.

What is claimed is:

1. A self-energized fire detector, comprising a detector unit, an alarm element, circuit means actuated by said detector element to actuate said alarm unit when said detector is exposed to light radiation of a predetermined type, a first electrical energy storage means for providing an electrical charge to the circuit means and the detector unit, and a second electrical energy storage means for providing an electrical charge to the alarm unit, and photo-generative power supply means operable to charge both of said electrical energy storage means when exposed to either ambient light or fire radiation.

2. A fire detector as set out in claim 1 in which means is provided for preventing discharge of said second electrical energy storage means as said first electrical energy storage means is being discharged.

References Cited by the Examiner
UNITED STATES PATENTS

| | | | |
|---|---|---|---|
| 2,450,990 | 10/1948 | Riggen | 340—228 |
| 2,621,239 | 12/1952 | Cade et al. | 340—228 |
| 2,824,175 | 2/1958 | Meacham et al. | |
| 3,038,106 | 6/1962 | Cutsogeorge et al. | 340—233 X |

FOREIGN PATENTS

| | | |
|---|---|---|
| 118,569 | 3/1959 | Russia. |

NEIL C. READ, *Primary Examiner.*